United States Patent [19]

Lester et al.

[11] Patent Number: 4,663,300

[45] Date of Patent: May 5, 1987

[54] POLLUTION CONTROL CATALYST

[75] Inventors: George R. Lester, Park Ridge; John F. Brennan, Des Plaines, both of Ill.

[73] Assignee: UOP Inc., Des Plaines, Ill.

[21] Appl. No.: 812,161

[22] Filed: Dec. 23, 1985

[51] Int. Cl.$^4$ .......................... B01J 29/24; B01J 29/26
[52] U.S. Cl. ...................................... 502/66; 502/74; 502/78
[58] Field of Search ............................ 502/78, 66, 74; 423/239, 239 A

[56] References Cited

U.S. PATENT DOCUMENTS

| | | | |
|---|---|---|---|
| 3,279,884 | 10/1966 | Nonenmacher et al. | 23/2 |
| 3,346,328 | 10/1967 | Sergeys et al. | 502/78 |
| 3,583,903 | 6/1971 | Miale et al. | 502/78 |
| 3,592,760 | 7/1971 | Young | 502/78 |
| 4,071,601 | 1/1978 | Shiraishi et al. | 423/239 |
| 4,085,193 | 4/1978 | Nakajima et al. | 423/239 |
| 4,104,361 | 8/1978 | Nishikawa et al. | 423/239 A |
| 4,113,660 | 9/1978 | Abe et al. | 423/239 A |
| 4,157,375 | 6/1979 | Brown et al. | 423/239 |
| 4,220,632 | 9/1980 | Pence et al. | 423/239 |
| 4,518,710 | 5/1985 | Brennan | 502/309 |
| 4,564,604 | 1/1986 | Iida et al. | 423/239 |

OTHER PUBLICATIONS

Joseph R. Klovsky, Pramod B. Koradia, and Charles T. Lim "Evaluation of a New Zeolitic Catalyst for NO$_x$ Reduction with NH$_3$" 1980 Edition Ind. Eng. Chem. Prod. Res. Dev., pp. 218–225, vol. 19.

*Primary Examiner*—Carl F. Dees
*Attorney, Agent, or Firm*—Thomas K. McBride; John F. Spears, Jr.

[57] ABSTRACT

A catalyst composition and a process are presented for the reduction of nitrogen oxides in flue gases to nitrogen. The catalyst comprises titania, mordenite and a metal component. The preferred metal component comprises vanadium oxide and tungsten oxide. At least 15 wt. % mordenite is present, with high silica H-mordenite being preferred.

19 Claims, No Drawings

POLLUTION CONTROL CATALYST

FIELD OF THE INVENTION

The invention relates to the composition of a catalytic composite useful in a pollution control process wherein nitrogen oxides are converted to nitrogen in a catalytically promoted reaction. The subject invention therefore relates to the composition of catalyst which may be employed in removing or eliminating nitrogen oxides from the flue gas streams generated by public utility boilers and other large furnaces consuming hydrocarbonaceous material as fuel. The subject invention therefore also relates to catalysts which may be employed in eliminating nitrogen oxides from the exhaust gas of internal combustion engines or gas fired turbines. The subject invention is specifically directed to the composition of the catalyst which would be employed in such processes.

PRIOR ART

Those skilled in the art of pollution control are familiar with many catalysts developed for the direct reduction of nitrogen oxides to nitrogen in flue gas streams. Several such catalysts are available commercially. A common feature of such catalysts for the reduction of nitrogen oxides (deNox catalyst) is a metal component. For instance, U.S. Pat. No. 3,279,884 issued to H. Nonnenmacher et al. describes the prior art as containing the use of platinum group metals and iron group metals in contrast to the vanadium oxides or molybdenum oxides or tungsten oxides presented in the patent. The catalysts of this patent are said to be used with advantage in the form of supported catalyst which may contain 2 to 50 percent of their total weight as oxides of vanadium, molybdenum, and/or tungsten. Alumina is given as an example of a suitable carrier for the metal components. The use of these three metals in a complex metal catalyst is further described in U.S. Pat. No. 4,071,601 to T. Shiraishi et al.

U.S. Pat. No. 4,085,193 issued to F. Nakajima et al. is believed pertinent for its teaching of a catalyst composition for the reduction of nitrogen oxides comprising as a chief ingredient an intimate mixture of titania and a metal component selected from the oxides of a large number of different metals including molybdenum, tungsten, iron, vanadium and cobalt. U.S. Pat. No. 4,518,710 issued to one of the applicants also describes a catalyst useful for the reduction of nitrogen oxides which comprises vanadium and optionally tungsten, with these metals being deposited upon an inorganic oxide support which is preferably titania. These references are also believed relevant for their showing that those skilled in the art are well versed in the use of these catalysts in pollution control processes.

The use of catalyst containing zeolites for the reduction of NOX is also described in the literature. For instance, the characteristics of a very large number of catalysts including several zeolite-containing catalysts is described in the article at pages 218-225 of Volume 19 of the 1980 edition of *Industrial Engineering and Chemical Products Research and Development*. Among the zeolitic catalysts listed in this reference are such materials as "natural zeolite", "H type zeolite", and synthetic mordenite. U.S. Pat. No. 4,220,632 issued to D. T. Pence et al. also describes deNOX catalyst containing zeolites and the use of these catalysts. Among the zeolitic catalysts described in this reference are a synthetic faujasite type zeolite, and a synthetic mordenite. The reference also indicates that it is contemplated to use only the hydrogen and sodium forms of zeolites. The reference indicates the preferred catalyst is a synthetic hydrogen mordenite, such as available Norton Chemical Company, since the mordenites are more acid resistant than other zeolites.

BRIEF SUMMARY OF THE INVENTION

The invention provides a unique catalyst composition highly effective in the conversion of nitrogen oxides to nitrogen. The subject catalytic composition is characterized by the fact that it contains both titania and a zeolite in addition to the metal component. The subject catalyst has the advantages of providing an activity comparable to that provided by the more traditional metal on titania composites while containing less of the expensive metals present in these titania-metal composites. The amount of such metals as molybdenum, titanium, and vanadium required in the catalyst bed can thereby be reduced by employing the subject catalyst. The subject catalyst should therefore be less expensive to produce.

A broad embodiment of the subject catalytic composition can be characterized as comprising at least 15 weight percent titania, at least 15 weight percent mordenite, and at least 0.5 weight percent of a metal component comprising an oxide and/or elemental form of a metal chosen from the group consisting of molybdenum, vanadium, tungsten, chromium and iron.

DETAILED DESCRIPTION

It has been recognized that the high temperature combustion of hydrocarbonaceous fuels results in the production of various nitrogen oxides which when released to the atmosphere result in pollution, smog, and other deleterious effects upon the environment. The production of nitrogen oxides can be minimized through careful control of the temperatures achieved during the combustion process. In addition, nitrogen oxides can be removed from flue gas streams through a "thermal deNOX" process and a reductant to convert the nitrogen oxides to nitrogen. Nitrogen oxides can also be removed from gas streams through the use of an adsorbent. However, these methods of nitrogen oxide elimination suffer from various disadvantages such as extreme operating conditions, the use of cyclic processes or a less than desired rate of conversion. Catalytic processes for the elimination of nitrogen oxides therefore find great utility in treating flue gases and other gas streams to eliminate nitrogen oxides as a source of pollution.

It is an objective of the subject invention to provide a catalyst and a process for removing nitrogen oxides from a gas stream. It is a specific objective of the subject invention to reduce the amount of expensive metal components such as molybdenum and tungsten employed within the nitrogen oxide reduction catalyst.

The subject invention may be applied to the reduction or elimination of nitrogen oxides in a wide variety of gas streams. Typical applications of the subject invention include treating a gas stream produced by a municipal utility boiler being operated to produce electricity or the effluent gas stream of a gas combustion turbine employed to drive an electric generator or other mechanical means. This variety in the possible sources of the gas stream being treated results in a corresponding variety in the composition of the gas stream being treated. The gas streams would typically contain a large amount of nitrogen remaining from the air used to support combustion, the nitrogen oxides, residual oxygen not consumed in the combustion process, combustion products such as carbon dioxide and carbon monoxide. The combustion of sulfur-containing fuels will result in the gas also containing sulfur oxides such as sulfur dioxide and sulfur trioxide. Gases produced by the combustion of coal or other residual fuels will likely contain suspended fine particles referred to as soot or fly ash, with the amount of this material present in the gas stream being determined by such factors as the composition of the fuel and whether the gas treating zone is located upstream or downstream of a particulate removal zone such as an electrostatic precipitator.

In utilizing the subject invention a nitrogen oxide containing gas stream is contacted with a catalytic composite described herein in admixture with a reductant and at conditions which promote the reduction of the nitrogen oxides to nitrogen. The reductant gas is typically admixed into the nitrogen oxide-containing feed gas stream upstream of the catalyst bed. The reductant is preferably ammonia but could be some other gaseous compound which will function as a reducing agent such as hydrogen or methane. The amount of reductant which is admixed into the gas stream will be of course dependent upon the concentration of nitrogen oxides in the gas stream being treated. The unnecessary addition of an excess amount of reductant is to be avoided as this may cause the reductant to become a part of the gas stream discharged to the atmosphere thereby causing rather than decreasing pollution. The use of an excess amount of reductant also unnecessarily increases the cost of operating the process. On the other hand, the amount of reductant must be sufficient for the conversion reaction with due consideration being given to the loss of the reductant to competing reactions. It is preferred that the quantity of ammonia added to the feed gas produces a mole ratio of ammonia to nitrogen oxides of from about 0.75:1.0 to about 1.5:1.0.

The reduction reaction has been described as being promotable by catalyst over the broad temperature range of from 200 degrees Centigrade to 800 degrees Centigrade. However, if the feed gas stream contains more than minimal amounts of sulfur oxides, the operating temperature should be above about 280 degrees Centigrade to 300 degrees Centigrade to prevent the formation of ammonia sulfates which can poison catalysts by physically plugging the pores. Excessively high temperatures can result in destructive reactions which consume the ammonia and may result in the formation of nitrogen oxides. It is therefore preferred that the reaction zone is operated at a temperature below about 500 degrees Centigrade. A preferred range of operating temperatures is from about 250 degrees Centigrade to about 450 degrees Centigrade. The pressure at which the reaction zone is operated will normally be dictated by the temperature of the flue gas stream as it is being discharged from its source. Typically, the discharge pressure of furnaces and other combustion means is quite low. The pressure maintained within the reaction zone will therefore preferably be from about 180 kPag down to about atmospheric pressure. It is believed that the pressure exerts only a very minimal effect upon the overall performance of the process and the process could therefore be performed with the reaction zone maintained at pressures of from about ½ atmosphere absolute to about 20 atmospheres or more if so desired.

In treating flue gas streams, it is normally a requirement that the pressure drop through the reaction zone be minimized. The exact arrangement of the catalytic composite within the reaction zone will be tailored to this criteria. The very large quantities of flue gas normally being treated combined with the desire for a low pressure drop normally results in preferred operating conditions including a relatively high space velocity. It is therefore preferred to employ the subject catalyst at conditions which include a gas hourly space velocity (GHSV) in excess of 20,000. A typical maximum allowable pressure drop is in the area of 0.2 atmospheres. The pressure drop and the manner in which the operating conditions are classified or characterized will often be dependent upon the form in which the catalyst is employed.

With the preferred "honeycomb" monolith, the operating conditions are preferably similar to that described in U.S. Pat. No. 4,358,428 issued to T. Fujita et al. Under the teaching of this reference, the hydraulic diameter of each of the channels extending through the honeycomb-shaped catalyst, should be larger than 2.0 millimeters and preferably 2.0 to 30 millimeters. The open frontal area of the monolith should exceed 50 percent with 50 to 95 percent being a preferred open area. The speed of the gas stream through the channels of the monolith should be within the broad range of 0.1 to 30 meters per second.

The exact placement and operation of the bed of gas treating catalyst will be dictated by the conditions, specifically temperature, present as the gas stream journeys from its discharge from the combustion zone to its point of discharge or venting into the atmosphere. The bed of catalyst will therefore normally be arrayed downstream of at least a first heat exchanger employed to recover heat from the hot flue gases but upstream of the final cooling step used to remove the remaining low level heat. A suitable placement and operational method for the subject catalyst in the treating of gas streams generated by a gas turbine is described in U.S. Pat. No. 4,106,286 assigned to A. Sakai et al. which is incorporated herein by reference.

The physical form or shape of the catalyst is subject to much variation, and the preferred form of the catalyst may be dependent upon the form of the reaction zone. For instance, a parallel passage reaction zone such as disclosed in U.S. Pat. Nos. 3,707,831 and 3,747,308 could be employed in a process for the reduction of nitrogen oxides. In these reactor systems, a large number of catalyst particles are confined into very elongated beds located between closely spaced apart porous screens. The flow of the gas stream being treated is parallel to the outer surface of these porous screens and the nitrogen oxides transfer by diffusion through the screen to contact the catalyst particles. This reactor system has the advantage of not becoming plugged by soot or fly ash or other particulate matter present in the gas stream as occurs when the gas stream is caused to actually pass through a screen or bed of catalyst. The subject catalyst could also be fabricated into the large surfaced flat ceramic contactors of U.S. Pat. No. 3,770,647. Yet another type of reaction system as disclosed in U.S. Pat. No. 3,966,879 can also be employed using the subject catalyst. In this reaction system, the gas is passed through a moving bed of catalyst particles. In addition to the catalytic effect, fine particles entrained in the gas stream are filtered from the gas stream and collected in the moving bed of catalyst. The fines are then separated from the catalyst and the catalyst is returned to the top of the moving bed.

The presently commercially prevalent form of deNOX catalyst consists of monoliths similar to those described above. Such a honeycomb shaped monolith is the preferred form of the subject catalyst. The catalyst can however be shaped into pellets, spheres, and extruded into a large number of shapes. Monolith type catalysts are often preferred for deNOX processes since they may be designed to provide a low pressure drop and to minimize or eliminate plugging or fouling problems caused by entrained particles in the gas stream being treated.

The subject catalyst is comprised of three main components—a titania component, a zeolite component, and a metal component. Titania (titanium dioxide) may be of the anatase or rutile form. The crystal structure of the former is very loose, while that of the latter is relatively densely packed. Anatase is the preferred form of titania for use in the present invention. The titania component may be prepared from titanyl sulfate ($TiOSO_4$) which forms the favored anatase structure. Hydrolysis of the titanyl sulfate, preferably at 60-80 degrees Centigrade, provides a high surface area colloidal titanium oxide which is relatively easy to extrude. The titanyl sulfate may also be neutralized with ammonia hydroxide to provide a gel which will also be in the anatase form. Gel titanias however are not as easily extruded.

Titania is preferably the major or most plentiful component of the catalyst. The catalyst must contain at least 15 weight percent titania. Preferably, the catalyst contains at least 25 weight percent titania. It is highly preferred that the catalyst contains at least 40 weight titania. The catalyst may contain up to about 75 weight percent or more titania if so desired.

The second most prevalent component of the subject catalyst is a zeolite. Preferably, the zeolite component is mordenite which could be either the sodium or hydrogen form of mordenite with hydrogen mordenite being highly preferred. The catalyst should contain a minimum of 15 weight percent hydrogen mordenite. It is highly preferred that the catalyst contains at least 25 weight percent mordenite and it is especially preferred that the catalyst contain at least 40 weight percent mordenite. However, the catalyst should not normally contain more than 50 weight percent mordenite.

Natural mordenite has been characterized as having a 5 structure represented by the formula $Na_8[Al_8Si_{40}O_{96}]24H_2O$. This indicates the silicon to aluminum ratio is about 5. It is preferred that the mordenite employed in the subject invention has a silicon to alumina ratio above 10:1.0. Silicon to aluminum ratios above 40.0:1.0 are highly preferred.

The smallest component by weight of the subject catalyst is the metal component. In general, a transition metal oxide is required to give adequate activity to the catalyst. The metal component may comprise a single metal or a mixture of two or more metals which should be chosen from the group consisting of molybdenum, vanadium, tungsten, chromium, and iron. The metals or metal are preferably present and will normally be present in the finished composite in the form of their oxides. The finished catalytic composite should contain at least 0.5 weight percent of the metal component based upon the weight of the elemental metal(s). Catalysts with higher metal contents are normally much more effective and a metal content over 1.5 weight percent is preferred and a metal content over 2.5 weight percent is highly preferred. The metal content of the finished catalytic composite, again based upon the elemental metal is preferably less than 15 weight percent. The preferred metals are tungsten and vanadium. It is highly preferred that the finished catalyst contains oxides of both vanadium and tungsten. Equal concentrations of tungsten and vanadium are acceptable in the catalyst.

The catalyst may also contain a binding agent or similar material added to the catalytic composite to aid in its formation or extrusion, etc. Alumina is the commonly used extrusion or binding aid and may be added to the catalytic composite in the form of boehmite or bentonite clay. The finished composite will contain at least 10 weight percent alumina when alumina is employed, but preferably contains less than 25 weight percent alumina.

A broad embodiment of the process of the subject invention may be characterized as a pollution control process for the reduction of nitrogen oxides present in a gas stream which comprises contacting the gas stream with a catalyst comprising at least 15 wt.% titania, at least 15 wt.% mordenite and at least 1.5 wt.% of a metal component chosen from the group consisting of the oxides of molybdenum, vanadium, tungsten, and chromium at reduction conditions including a temperature over 250 degrees Centigrade and in the presence of a reductant.

COMPARATIVE EXAMPLES

The following examples demonstrate the catalytic performance of various materials which were tested in order to evaluate their relative performance as catalysts for the reduction of nitrogen oxides in flue gas. The testing procedure in all instances was the same. The feed gas stream used in these tests was a synthetic flue gas stream having a one to one molar ratio of NO to $NH_3$. This synthetic flue gas contained 420 ppm of NO, 420 ppm $NH_3$, 3.6 mole percent $O_2$, 5.2 percent $CO_2$, 1,000 ppm $SO_2$ and 12.3 percent $H_2O$. The balance of the sythentic flue gas stream was nitrogen. The test reaction zone was operated at a gas hourly space velocity (GSHV) of 120,000. The tests were run at a pressure of 139 kPag, 6 psig. Each test reaction zone was loaded with 2.5 milliliters of a 1/16th inch diameter (0.13 cm)×¼ inch (0.635 cm) extrudate. The test sequence consisted of lining out the reaction zone at 450 degrees Centigrade and obtaining tests results and then reducing the temperature and obtaining lined out operating test results at 400 degrees Centigrade, 350 degrees Centigrade, 300 degrees Centigrade, and 250 degrees Centigrade. The results of this testing are shown in the table below.

Catalyst A is a commercially available nitrogen oxide reduction catalyst marketed under the trade name "JP501". It is believed this catalyst is manufactured in accordance with or under procedures resembling those set out in previously cited U.S. Pat. No. 4,085,193 assigned to Mitsubishi Petrochemical Company Limited; Hatachi Limited; and Babcock-Hitachi Kabushiki Kaisha. This is a nonzeolitic catalyst based upon a titania support material which contains tungsten and vanadium as the active metallic component. This catalyst is known for its good conversion characteristics and excellent resistance to attrition by the chemicals and conditions found in treating flue gases.

Catalyst B is a 50 percent admixture of catalyst A plus 50 percent of a gamma alumina binder. The preparation of this catalyst comprises obtaining a fine powder of each of the two components and thoroughly admixing the two powders. Water is then added to the admixture as an extruding agent and it is extruded. The formed extrudate is then dried on a steam table and calcined to a temperature of 540 degrees Centigrade. This same formation or preparation technique was employed for all of the catalytic materials presented herein.

Catalyst C comprises an extrudate formed from a mixture of 80 weight percent hydrogen form mordenite and 20 weight percent gamma alumina binder. The mordenite had a silicon to aluminum ratio of 48. No metals were present upon this catalyst.

Catalyst D is a catalyst prepared in the same manner as Catalyst C except that the catalyst was impregnated with a ferric nitrate solution to obtain a finished catalyst containing 0.2 weight percent iron.

Catalyst E is also a catalyst prepared in the same manner as Catalyst C but is impregnated with a ferric nitrate solution to obtain a finished catalyst containining 2 weight percent iron.

Catalyst F was made by admixing 50 weight percent powdered JP501 with 40 weight percent powdered hydrogen form mordenite and 10 weight percent of the gamma alumina binder. This material was then extruded.

Catalyst G is a physical admixture of two different catalysts, which were blended together. Fifty percent of the extrudate particles were JP501. The remaining 50 percent were Catalyst C. This results in an overall weight composition equal to Catalyst F.

An additional test was performed using Catalyst F but the composition of the synthetic flue gas was adjusted in that no sulfur oxides were present. The results of this test are given in the last line of the table.

| Catalyst | Percent NO Conversion versus Temperature | | | | |
|---|---|---|---|---|---|
| | Temperature (degrees Centigrade) | | | | |
| | 450 | 400 | 350 | 300 | 250 |
| A | 76.3 | 79.1 | 76.0 | 65.7 | 48.3 |
| B | 32.4 | 37.4 | 34.3 | 28.0 | 10.3 |
| C | −22.0 | −5.8 | −2.9 | −2.4 | −13.5 |
| D | 27.9 | 40.8 | 21.6 | −0.3 | 1.1 |
| E | 34.3 | 28.6 | 24.3 | 8.0 | 7.1 |
| F | 67.1 | 72.8 | 69.5 | 60.7 | 33.2 |
| G | 41.4 | 48.4 | 46.5 | 37.3 | 25.3 |
| F* | 65.5 | 61.7 | 40.6 | 11.7 | −3.5 |

*No $SO_2$ in feed flue gas

This series of tests indicates that mordenite by itself (Catalyst C) demonstrated very little catalytic activity for the reduction of nitrogen oxide at the conditions tested. The negative NO conversion is indicative of ammonia being oxidized to form nitric oxide. It is only when a metal component is added to the mordenite that any appreciable catalytic activity is demonstrated. This is shown by the results of the test employing catalysts D and E.

The test performed with the Catalyst B indicates that the alumina functions basically as a diluent to the active catalyst and results in activity which was characteristic of dilution within an inert material. The test employed with the physical catalyst mixture G showed a decreased activity also characteristic of simple dilution of the JP501 catalyst within inert material.

The Catalyst F, which is representative of the subject invention, exhibited activity which is near that of the fresh undiluted JP501 reference catalyst. It therefore demonstrates that the objective of providing a highly active catalyst containing significantly reduced amounts of the expensive metals was achieved. The resultant composite is considerably more active than would be expected based upon the results of testing the individual components of the composite. That is, it would not be expected that a blend of equal amounts of the active JP501 with a material showing no catalytic activity (Catalyst C in the above test) would result in a composite having activity quite near that of the undiluted JP501. It is also surprising that this material, which by itself gave such poor results, does not degrade the performance of the overall composite so as to render it similar to the results of Catalyst B.

The tests performed using Catalyst F but without the presence of sulfur oxides in the synthetic flue gas demonstrate that the subject composite is also quite active in the conversion of nitrogen oxides in the absence of sulfur oxides.

We claim as our invention:

1. A catalyst composition useful in pollution control processes which comprises an admixture of at least 15 wt.% titania, at least 15 wt.% mordenite and at least 0.5 wt.% of a metal component comprising an oxide and/or an elemental form of a metal chosen from the group consisting of molybdenum, vanadium, tungsten, chromium, and iron.

2. The catalyst of claim 1 further characterized in that the catalyst comprises a vanadium oxide.

3. The catalyst of claim 1 further characterized in that the catalyst comprises a tungsten oxide.

4. The catalyst of claim 3 further characterized in that the catalyst comprises a vanadium oxide.

5. The catalyst of claim 4 further characterized in that the catalyst comprises at least 40 wt.% mordenite.

6. The catalyst of claim 1 further characterized in that the mordenite has a silicon to aluminum ratio above 10.0.

7. A catalytic composite useful in processes for the reduction of nitrogen oxides in gas streams which comprises an admixture of at least 25 wt.% titania, at least 25 wt.% mordenite and at least 0.5 wt.% of a metal component comprising an oxide and/or an elemental form of a metal chosen from the group consisting of molybdenum, vanadium, tungsten, and chromium.

8. The catalyst of claim 7 further characterized in that the catalyst comprises over 1.5 wt.% of the metal component.

9. The catalyst of claim 8 further characterized in that the catalyst comprises at least 10 wt.% alumina.

10. The catalyst of claim 8 further characterized in that the catalyst comprises a vanadium oxide.

11. The catalyst of claim 10 further characterized in that the catalyst comprises a tungsten oxide.

12. The catalyst of claim 10 further characterized in that the mordenite is H-mordenite.

13. The catalyst of claim 12 further characterized in that the catalyst comprises at least, 40 wt.% mordenite.

14. The catalyst of claim 7 further characterized in that the catalyst comprises at least 40 wt.% titania.

15. The catalyst of claim 14 further characterized in that the catalyst comprises a vanadium oxide and a tungsten oxide.

16. The catalyst of claim 15 further characterized in that the catalyst comprises at least 1.5 wt.% of the metal component.

17. The catalyst of claim 16 further characterized in that the catalyst comprises at least 2.5 wt.% of the metal component.

18. The catalyst of claim 16 further characterized in that the mordenite has a silicon to aluminum ratio above 10:1.

19. The catalyst of claim 18 further characterized in that the mordenite has a silicon to aluminum ratio above 40:1.

* * * * *